United States Patent
Klein et al.

(10) Patent No.: US 11,993,346 B2
(45) Date of Patent: May 28, 2024

(54) BATTERY UNIT AND BICYCLE FRAME

(71) Applicant: Canyon Bicycles GmbH, Koblenz (DE)

(72) Inventors: Philipp Klein, Koblenz (DE); Christian Parmenter, Koblenz (DE); Vincenz Thoma, Obermaiselstein (DE); Patrick Schmidt, Koblenz (DE)

(73) Assignee: Canyon Bicycles GmbH, Koblenz (DE)

( * ) Notice: Subject to any disclaimer, the term of this patent is extended or adjusted under 35 U.S.C. 154(b) by 186 days.

(21) Appl. No.: 17/410,464

(22) Filed: Aug. 24, 2021

(65) Prior Publication Data

US 2022/0063759 A1    Mar. 3, 2022

(30) Foreign Application Priority Data

Aug. 27, 2020   (DE) .................... 20 2020 104 966.6

(51) Int. Cl.
*B62M 6/90* (2010.01)
*B62K 19/40* (2006.01)
*B62M 6/40* (2010.01)
*H01M 10/42* (2006.01)

(52) U.S. Cl.
CPC ............... *B62M 6/90* (2013.01); *B62K 19/40* (2013.01); *B62M 6/40* (2013.01); *H01M 10/425* (2013.01); *H01M 2010/4271* (2013.01)

(58) Field of Classification Search
CPC .......... B62M 6/90; B62M 6/40; B62K 19/40; H01M 10/425; H01M 2010/4271; H01M 2220/20; H01M 50/204; H01M 50/249; H01M 50/284; Y02E 60/10; B62J 43/13; B62J 43/28; H02J 7/0042
See application file for complete search history.

(56) References Cited

U.S. PATENT DOCUMENTS

| | | | |
|---|---|---|---|
| 9,676,443 B2 | 6/2017 | Perkins et al. | |
| 9,777,774 B2* | 10/2017 | Biechele | B62K 19/34 |
| 10,457,352 B2* | 10/2019 | Durdevic | B62K 19/04 |
| 2012/0003505 A1 | 1/2012 | Kim | |
| 2015/0221909 A1 | 8/2015 | Maruoka et al. | |
| 2016/0194053 A1 | 7/2016 | Preining et al. | |
| 2016/0268641 A1 | 9/2016 | Baek et al. | |
| 2016/0303961 A1* | 10/2016 | Hendey | B62J 1/08 |
| 2018/0241022 A1* | 8/2018 | Nishihara | B60L 50/64 |
| 2019/0337587 A1* | 11/2019 | den Hertog | H01M 50/262 |

(Continued)

FOREIGN PATENT DOCUMENTS

| | | | |
|---|---|---|---|
| CN | 202358266 U | * | 8/2012 |
| CN | 109461859 A | | 3/2019 |

(Continued)

OTHER PUBLICATIONS

Translated DE-102018006691-A1 (Year: 2023).*

*Primary Examiner* — James A Shriver, II
*Assistant Examiner* — Ian Bryce Shelton
(74) *Attorney, Agent, or Firm* — The Webb Law Firm

(57) ABSTRACT

A battery unit for a bicycle having an electric motor, including a battery case having an upper side, a lower side and two sidewall several energy cells arranged in the battery case, and a battery management system electrically connected to the energy cells, where the battery management system is arranged on one of the two sides.

18 Claims, 3 Drawing Sheets

(56) References Cited

U.S. PATENT DOCUMENTS

| | | | |
|---|---|---|---|
| 2019/0337588 A1* | 11/2019 | Wecker | B62K 19/40 |
| 2020/0062325 A1* | 2/2020 | Talavasek | B62J 43/28 |
| 2020/0212510 A1* | 7/2020 | Holden | H02J 7/0042 |
| 2020/0247502 A1* | 8/2020 | Mitsuyasu | H01M 50/202 |
| 2020/0354017 A1* | 11/2020 | De La Serna Gonzalez | B62J 43/28 |
| 2020/0376983 A1* | 12/2020 | Titus | H04W 4/40 |
| 2021/0147032 A1* | 5/2021 | Farrell | B62K 3/08 |
| 2021/0265607 A1* | 8/2021 | Bosscher | H01M 50/24 |
| 2022/0033032 A1* | 2/2022 | Senoo | E05B 47/0603 |

FOREIGN PATENT DOCUMENTS

| | | | | |
|---|---|---|---|---|
| CN | 111384333 A | 7/2020 | | |
| DE | 102014226828 A1 * | 6/2016 | | B62J 43/00 |
| DE | 102015003386 A1 | 9/2016 | | |
| DE | 102016102361 A1 | 9/2016 | | |
| DE | 102016001569 A1 * | 8/2017 | | B62M 6/90 |
| DE | 102014226828 B4 | 2/2019 | | |
| DE | 102018006691 A1 | 2/2019 | | |
| DE | 102018006691 A1 * | 2/2019 | | B60L 50/64 |
| DE | 202018005473 U1 * | 2/2019 | | |
| DE | 202018005473 U1 | 2/2019 | | |
| EP | 2280436 A2 | 2/2011 | | |
| EP | 2731858 B1 | 1/2017 | | |
| EP | 3590814 A1 * | 1/2020 | | B62J 43/13 |
| EP | 3590814 A1 | 1/2020 | | |
| EP | 3683858 A1 * | 7/2020 | | |
| KR | 1020200020565 A | 2/2020 | | |
| WO | WO-2013007828 A2 * | 1/2013 | | B62J 99/00 |
| WO | WO-2020109318 A1 * | 6/2020 | | B62K 19/34 |

* cited by examiner

BATTERY UNIT AND BICYCLE FRAME

CROSS-REFERENCE TO RELATED APPLICATION

This application claims priority to German Patent Application No. 20 2020 104 966.6 filed Aug. 27, 2020, the disclosure of which is hereby incorporated by reference in its entirety.

BACKGROUND OF THE DISCLOSURE

Field of the Disclosure

The disclosure relates to a battery unit for a bicycle comprising an electric motor, i.e. an e-bike. The disclosure further relates to a bicycle frame, in particular a bicycle frame for mountain bikes or trekking bikes. The disclosure further relates to a bicycle frame comprising a battery unit.

Description of Related Art

Bicycle frames usually comprise a down tube, a head tube and a saddle tube. The down tube is connected to the head tube that receives the front wheel fork. The head tube can be connected to the down tube. Usually, the saddle tube and the down tube are connected to a motor housing. Bicycles comprising an electric motor are provided with a motor housing instead of a pedal crankcase. Furthermore, e-bikes are known in which the electric motor is arranged in the rear wheel hub. In bicycle frames with a motor housing, the electric motor and thus the motor housing are formed to be asymmetrical. This is due to the fact that sufficient installation space must be provided on the chain ring side for the chain ring and the arrangement of the chain. Thus, the electric motor protrudes with respect to a frame center plane from the side facing away from the chain ring. In particular, the frame center plane is the symmetry plane of the frame formed by the saddle tube and the head tube. In case of a mounted bicycle, the rear wheel and, when riding straight ahead, also the front wheel is located in the same plane. The motor housing is formed asymmetrically to the frame center plane.

E-bikes each comprise battery units which can be arranged at different position of the frame. In modern e-bikes, the battery unit is arranged in the down tube. It is known from EP 3 590 814 to connect the down tube to the motor housing such that the down tube has an insertion opening substantially below the motor housing to insert the battery into the down tube.

Known battery units have a battery case in which energy cells are arranged. The individual cells are usually arranged in longitudinal direction of the battery case. The housings have a constant symmetrical cross-section across the entire length.

SUMMARY OF THE DISCLOSURE

An object of the disclosure is to improve the design of a battery unit and of the bicycle frame. Preferably, the purpose is to achieve a battery with the largest possible capacity with an advantageous configuration of the frame geometry.

The object is achieved according to the disclosure by a battery unit according to claim 1 and a bicycle frame according to claim 8.

The battery unit according to the disclosure for a bicycle frame having an electric motor comprises a battery case. The battery case has at least an upper side, a lower side and two sidewalls. The battery case can have a substantially rectangular cross-section, with the ends being flattened or rounded. Several energy cells are arranged in the battery case for energy storage. Furthermore, a battery management system (BMS) connected to the energy cells is provided. According to the disclosure, the battery management system is arranged on one of the two sidewalls. In particular, the battery management system is arranged or configured such that it is partially arranged next to the energy cells. With respect to the battery case, the battery management system is thus not arranged in the area of a front side or rear side of the case. The front side and the rear side are the sides terminating the battery case in longitudinal direction.

The lateral arrangement of the battery management system allows a larger number of energy cells to be arranged along the length of the battery case. In this respect, the total capacity can be increased. The lateral arrangement of the battery management system further allows the down tube of the bicycle frame to be designed such that the laterally and thus asymmetrically arranged battery management system can be arranged on the side facing away from the chain ring. In this area, the asymmetrical motor housing also protrudes. In this respect, a visually slimmer design of the bicycle frame can be achieved, particularly in the area of the down tube. In the direction of insertion of the battery unit into the down tube of the bicycle frame, it is thus advantageous that the battery management system is arranged on the left side.

Preferably, the battery management system is arranged partially or entirely within the battery case so that the battery management system is protected. In a preferred embodiment, a plug contact of the battery management system is arranged such that it is also arranged laterally. A plug to be inserted into the plug contact for electrical connection to the electric motor must therefore be inserted laterally with respect to the longitudinal direction of the battery case. Depending on the configuration of the plug, the direction of insertion of the plug is thus perpendicular or parallel to the longitudinal axis of the battery housing.

In a particularly preferred embodiment, the battery case tapers in longitudinal direction or in the direction of insertion. In particular, a stepped taper can be provided. In a preferred embodiment, the battery case is wider in the area in which the battery management system is arranged and comprises an indentation. In longitudinal direction, the battery case preferably has an inwardly leading step at which the battery management system ends in longitudinal direction.

For the arrangement of the battery management system in the battery housing, it is preferred that the case has a preferably cuboid lug with respect to the area in which no battery management system is arranged.

It is further preferred that the battery case has a smaller width at a front side than at a rear side. The front side and the rear side are the sides terminating the battery case in longitudinal direction of the battery case. The front side is the upper side when the battery unit is installed.

In a particularly preferred embodiment, the individual energy cells are arranged in the case transverse to the longitudinal direction of the case. The individual energy cells are thus arranged one behind the other in longitudinal direction.

It is also possible to arrange a larger number of energy cells in the battery case so that a battery unit with a larger number of energy cells and greater power can be formed with the dimensions of the battery case being the same.

The bicycle frame according to the disclosure, which is in particular a mountain bike frame or a trekking bike frame, has a motor housing for accommodating an electric motor. A down tube is connected to the motor housing. In a preferred embodiment, the bicycle frame has a down tube connected to the saddle tube. Furthermore, a top tube may be provided that is connected to the saddle tube. In an embodiment according to the disclosure, it is preferred that the down tube and the top tube are connected to a head tube receiving a front wheel fork.

The down tube is connected to the motor housing such that an insertion opening is provided in the area of the motor housing in the down tube. The insertion opening, which is preferably closable with a lid, serves for inserting the battery unit into the down tube. In this respect, the down tube is asymmetrical with respect to a frame center plane. Preferably, the asymmetry is configured such that the down tube is formed asymmetrically, in particular at the area facing in the direction of the motor housing or connected to the motor housing. It is preferred that in this area the down tube has larger extension with respect to the frame center line on the side facing away from the chain ring than on the chain ring side.

Preferably, the down tube is configured such that it tapers from the motor housing. Thus, the down tube particularly tapers in the direction of the head tube or in the direction of travel, respectively.

In a particularly preferred embodiment, the cross-sectional change or tapering of the down tube takes place such that the down tube tapers less on the chain ring side with respect to the frame center plane than on the side facing away from the chain ring. In particular, the chain ring side of the down tube is parallel to the frame center plane. The asymmetry of the down tube is thus formed on the side facing away from the chain ring. It is particularly preferred that the distance between the outer side of the down tube and the frame center plane decreases on the side facing away from the chain ring starting from the motor housing.

Preferably, the motor housing is also formed asymmetrically with respect to the frame center plane. In particular, the motor housing protrudes with respect to the center plane from the side facing away from the chain ring. It is further preferred that the motor housing protrudes on the same side as the down tube. The motor housing and the down tube are thus designed asymmetrically on the same side with respect to the frame center plane.

In a preferred further embodiment of the disclosure, the down tube has a height of less than 80 mm in side view, in particular less than 75 mm and particularly preferred less than 70 mm. The height of the down tube is the external dimension perpendicular to the longitudinal direction of the down tube.

It is particularly preferred that the bicycle frame has a battery unit in the down tube as described above. It is particularly preferred that the battery unit is arranged in the down tube such that the battery management system is arranged on the side facing away from the chain ring.

The battery unit, which is arranged in a preferred embodiment in the down tube of the bicycle frame, is advantageously further configured as described above.

BRIEF DESCRIPTION OF THE DRAWINGS

In the following, the disclosure is described in more detail by means of a preferred embodiment with reference to the accompanying drawings, in which.

DETAILED DESCRIPTION

Figure 1:
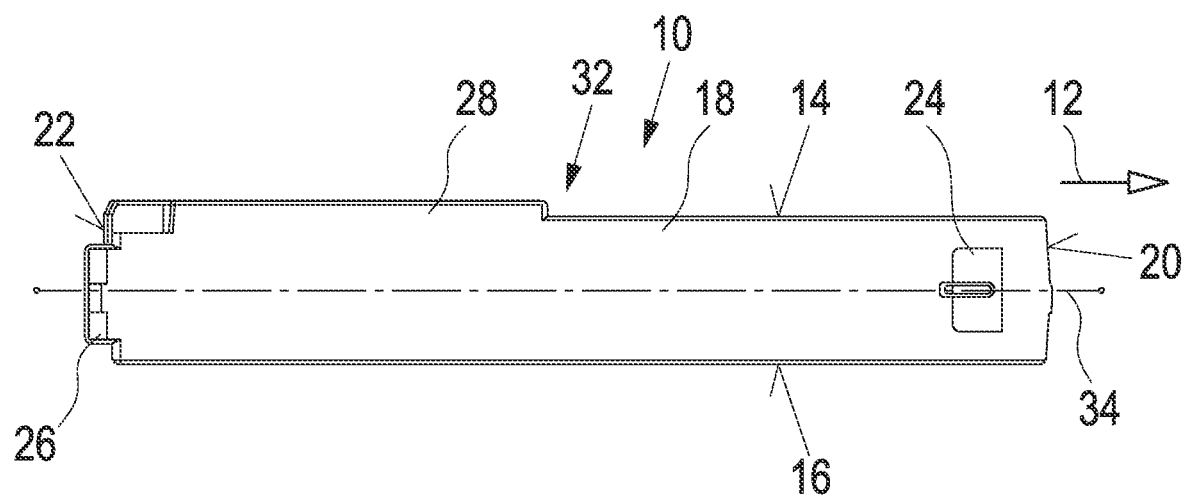
FIG. 1 shows a schematic plan view of a battery.

The battery unit has a housing 10. With respect to a longitudinal direction or a direction of travel 12, the housing 10 has a left sidewall 14 and an opposite right sidewall 16. The battery case further has an upper side 18 and a lower side opposite to the upper side 18. The case, which substantially has a rectangular cross-section in the illustrated exemplary embodiment, also has a front side 20 facing in the direction of travel 12 and a rear side 22 facing in the opposite direction to the direction of travel 12. A fastening or contact element is arranged on the upper side 12 in the front area, facing the front side 20, which rests against an inner side of the down tube of the bicycle frame when the battery unit is mounted. A further retaining element 26, which in particular has a passage opening extending transversely to the longitudinal direction 12, is arranged at the rear side 22 and serves to fix the battery unit in the down tube.

Figure 2:
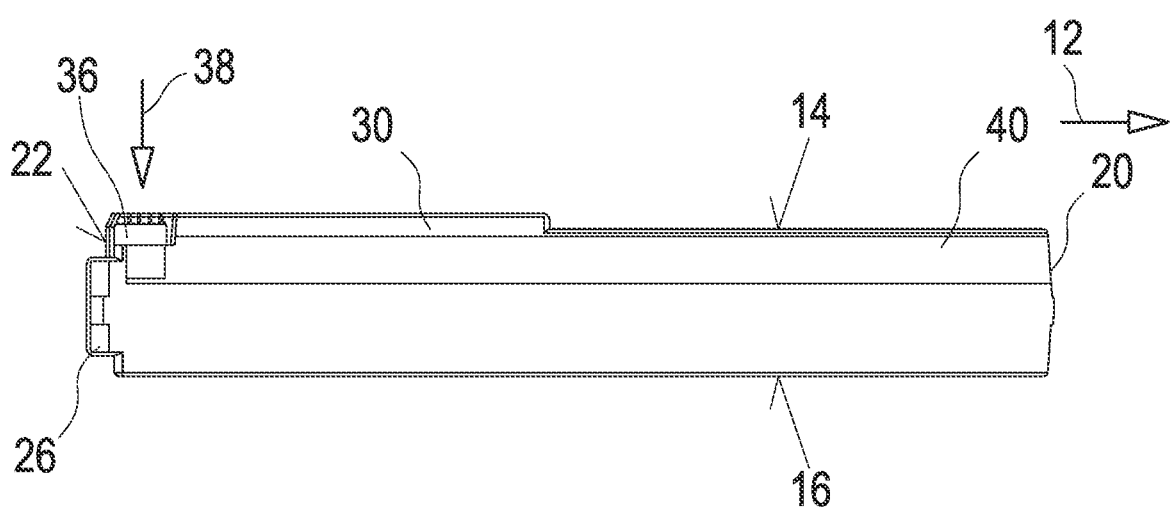
FIG. 2 shows a schematic sectional view of the battery unit, wherein it is a horizontal section in longitudinal direction of the battery unit.

On the side facing away from the chain ring or on the left side 12, the battery case 10 has a substantially cuboid indentation 28. The cuboid indentation 28 preferably extends across the entire height of the case or the side wall 14, respectively. In longitudinal direction 12, the indentation 28 extends across approximately 30-50% of the total length of the battery case depending of the embodiment. Preferably, at least a majority of a battery management system 30 (FIG. 2) is arranged in the lug 28.

The sidewall 14 has a step 32 in longitudinal direction 12. In the area of the step 32, the width of the battery case 10 decreases. Thus, a battery case 10 is created that, with respect to a direction of insertion 12, has a smaller cross-sectional dimension in a front area that in a rear area. With respect to a center plane 34 perpendicular to a drawing plane of FIG. 1, the battery case 10 is symmetric in the area in which no lug 28 is provided and correspondingly asymmetrical in the area of the lug 28.

The battery management system 30 comprises a plug contact 36 or is connected thereto, respectively. The plug contact faces towards the sidewall 14 so that the plug is usually inserted into the plug contact 36 in the direction of an arrow 38, i.e. perpendicular to the longitudinal direction 12.

The individual energy cells 40 that are arranged within the battery case 10 are preferably arranged such that they are arranged transversely to the longitudinal direction 12.

The bicycle frame according to the disclosure has a down tube 42 which is connected to a motor housing 44. Here, the down tube 42 is connected to the motor housing 44 such that a lower end of the down tube 42 is arranged below the motor housing 44 or a lower insertion opening 46 is accessible for inserting a battery device into the down tube 42. On the opposite side, the down tube 42 is connected to a head tube 48. In the illustrated exemplary embodiment, the motor housing 44 is further connected to a saddle tube 50. The saddle tube 50 is then connected to a top tube 52 that is also connected to the head tube 48. In a preferred embodiment, the bicycle frame is made of a glass fiber reinforced material, in particular carbon.

Figure 3:
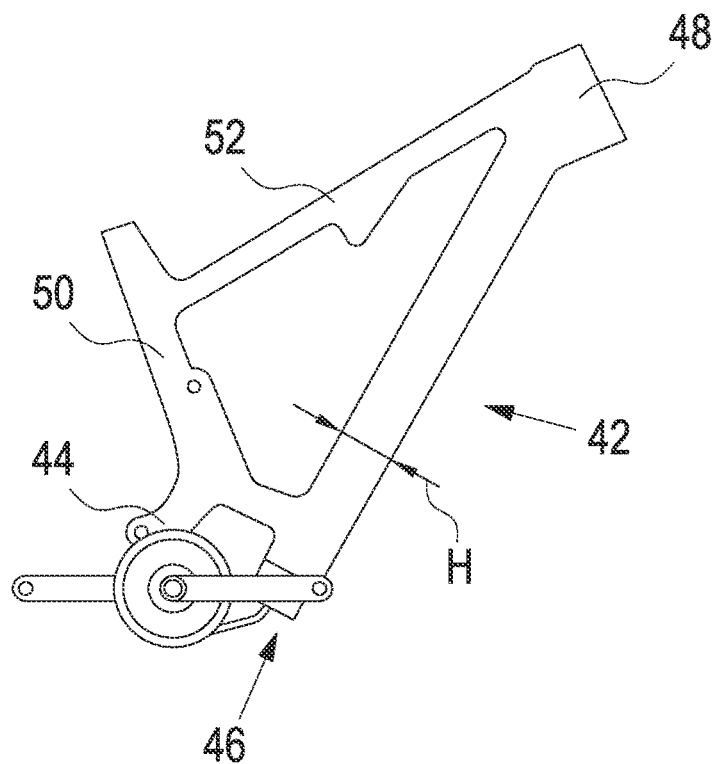
FIG. 3 shows a schematic side view of a frame.

In the side view shown in FIG. 3, the down tube 42 has a small height H of in particular <80 mm, compared to known bicycle frames in whose down tube a battery device can be arranged. It is particularly preferred that the height H is <75 mm, in particular <70 mm.

Figure 4:
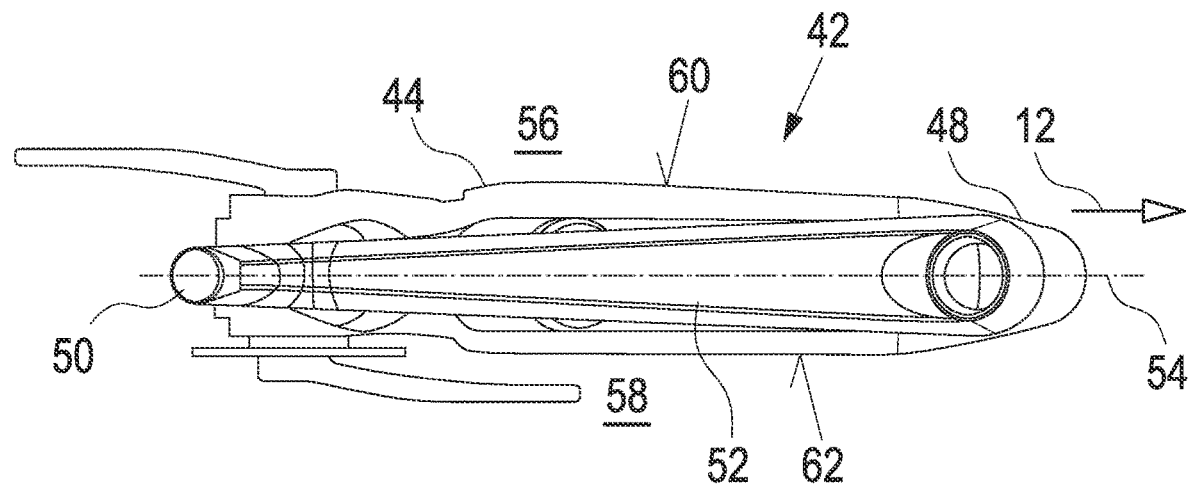
FIG. 4 shows a schematic plan view of the bicycle frame shown in FIG. 3.

With respect to a frame center plane 54 (FIG. 4), the down tube 42 is formed asymmetrical. The frame center plane 54 extends through the center of the head tube 48 and through the center of the saddle tube 50. In the illustrated exemplary embodiment, the top tube 52 is also symmetrical to the frame center plane 54. In the direction of travel 12, the cross-section and the width of the top tube 52 increases, in particular continuously, from the saddle tube 50 towards the head tube 48.

The motor housing 44 is also formed asymmetrically with respect to the frame center plane. The motor housing 44 protrudes on the left side in the direction of travel 12 or on the side 56 facing away from the chain ring, respectively. Thus, the distance is larger from an outer side of the motor 44 to the frame center line 54 than on the chain ring side 58.

The down tube 42 is also asymmetrical toward the side 56 facing away from the chain ring, so that also with respect to the down tube, the distance between an outer side of the down tube to the frame center plane 54 is greater on the side 56 facing away from the chain ring than on the chain ring side 58. In particular, there is a stepless transition between the motor housing 44 and the down tube 42. The width of the down tube in plan view (FIG. 4) tapers, i.e. it decreases from the motor housing 44 towards the head tube 48. The left side 60 of the down tube 42 in the direction of travel 12 is thus inclined towards the frame center plane 54 or has an acute angle thereto, respectively.

Figure 5:
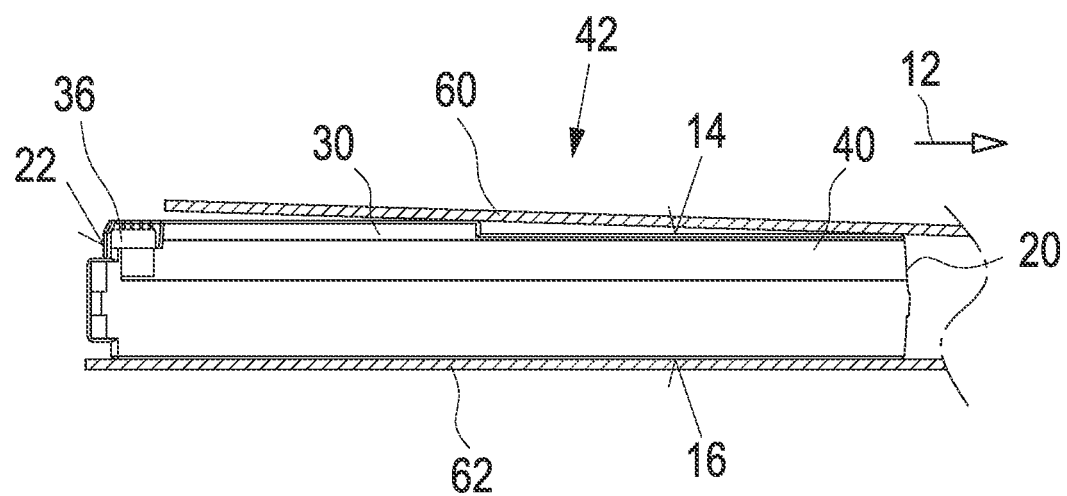
FIG. 5 shows a schematic sectional view of the down tube with inserted battery unit.

In a preferred embodiment the opposite right side or the chain ring side 62 of the down tube 42 is parallel to the frame center plane 54. As can be seen in particular from the schematic longitudinal section of the down tube 42 with inserted battery 40 (FIG. 5), the down tube 42 tapers in the direction of travel 12. Here, in the illustrated exemplary embodiment, a right side 62 of the down tube 42 facing in the direction of travel is parallel to the direction of travel 12. The opposite side 60 of the down tube 42, with respect to the frame center plane 54 or with respect to the direction of travel 12, extends so as to converge with the opposite sidewall 62. Thus, the distance between the two sidewall 60, 62 of the down tube 42 decreases in the direction of travel 12.

The invention claimed is:

1. A battery unit for a bicycle having an electric motor comprising:
  a battery case having an upper side, a lower side and two sidewalls, where the battery case is designed to receive a plurality of energy cells such that the plurality of energy cells may be arranged in the battery case; and
  a battery management system electrically connected to the energy cells,
  wherein the battery management system is arranged on one of the two sidewalls,
  wherein a plug contact is part of the battery management system such that the plug contact is oriented to face towards a side of a down tube of a bicycle frame such that a plug can be inserted into the plug contact in a direction that is perpendicular to the side of the down tube, and
  wherein the plug contact is arranged laterally for electrical connection to the electric motor.

2. The battery unit according to claim 1, wherein the battery management system is arranged in the battery case.

3. The battery unit according to claim 1, wherein the battery management system is arranged at one of the two sidewalls in a direction of insertion.

4. The battery unit according to claim 1, wherein the battery case tapers in a direction of insertion.

5. The battery unit according to claim 1, wherein the battery case has a smaller width at a front side than at a rear side.

6. A bicycle frame comprising:
  a motor housing for an electric motor:
  a down tube connected to the motor housing: and
  an insertion opening provided in the down tube in the area of the motor housing for inserting a battery into the down tube,
  wherein the down tube is asymmetrical with respect to a frame center plane, and
  wherein the asymmetrical portion of the down tube contains a battery management system located therein and the battery management system is connected to the battery.

7. The bicycle frame according to claim 6, wherein the down tube tapers from the motor housing.

8. The bicycle frame according to claim 7, wherein the down tube tapers less on a chain ring side, with respect to the frame center plane than on a side facing away from the chain ring.

9. The bicycle frame according to claim 6, wherein the down tube is parallel to the frame center plane on a chain ring side.

10. The bicycle frame according to claim 6, wherein the side of the down tube facing away from a chain ring has a decreasing distance towards the frame center plane, starting from the motor housing.

11. The bicycle frame according to claim 6, wherein the motor housing is asymmetrical with respect to the frame center plane.

12. The bicycle frame according to claim 10, wherein the motor housing is asymmetrical to the same side as the down tube.

13. The bicycle frame according to claim 6, wherein the down tube in side view has a height of less than 80 mm in side view.

14. The battery unit according to claim 13, wherein the battery management system is arranged on a side facing away from a chain ring.

15. The battery unit according to claim 1, wherein a plug contact is arranged laterally for electrical connection to the electric motor as part of the battery management system.

16. The battery unit according to claim 1, wherein the battery case tapers in a direction of insertion and comprises a step.

17. The bicycle frame according to claim 6, wherein the down tube in side view has a height less than 75 mm.

18. A bicycle frame comprising:
  a motor housing for an electric motor;
  a battery unit for the electric motor, the battery unit comprising:
    a battery case having an upper side, a lower side and two sidewalls, where the battery case is designed to receive a plurality of energy cells such that the plurality of energy cells may be arranged in the battery case; and
    a battery management system electrically connected to the energy cells, wherein the battery management system is arranged on one of the two sidewalls;

a down tube connected to the motor housing; and an insertion opening provided in the down tube in the area of the motor housing for inserting a battery into the down tube, wherein the down tube is asymmetrical with respect to a frame center plane, and wherein the asymmetrical portion of the down tube contains a battery management system located therein and the battery management system is connected to the battery.

\* \* \* \* \*